April 24, 1928.

I. J. VAN HUFFEL 1,667,178

ELECTRICAL WELDING APPARATUS

Original Filed April 14, 1926   3 Sheets-Sheet 3

Inventor

I. J. VAN HUFFEL

By Fisher, Moser & Moore
Attorney

Patented Apr. 24, 1928.

1,667,178

UNITED STATES PATENT OFFICE.

ISADORE J. VAN HUFFEL, OF WARREN, OHIO.

ELECTRICAL WELDING APPARATUS.

Original application filed April 14, 1926, Serial No. 101,885. Divided and this application filed October 13, 1926. Serial No. 141,291.

My invention relates to an improvement in electrical welding apparatus, such apparatus for example as the welding machine shown and described in my co-pending application filed April 14, 1926, Serial No. 101,885, of which this application is a division. In general such machines are designed for welding a longitudinal seam in a metal tube, and my object in the present instance is to provide annular electrodes and adjustable brushes within said electrodes whereby the welding current may be passed through a segmentary portion of each annulus and concentered in the tube at each side of the seam and in a localized area under pressure. The brushes for the annular electrodes are also mounted directly upon the transformer secondary to promote efficiency in operations, and the secondary is particularly constructed to suspend a pair of brushes at diverging angles within a pair of ring-shaped electrodes which are also supported in angular relation to facilitate adjustments and clamping of the work as well as to permit convenient assembly of the parts and to make them accessible for inspection, repairs and replacements.

Figure 1:
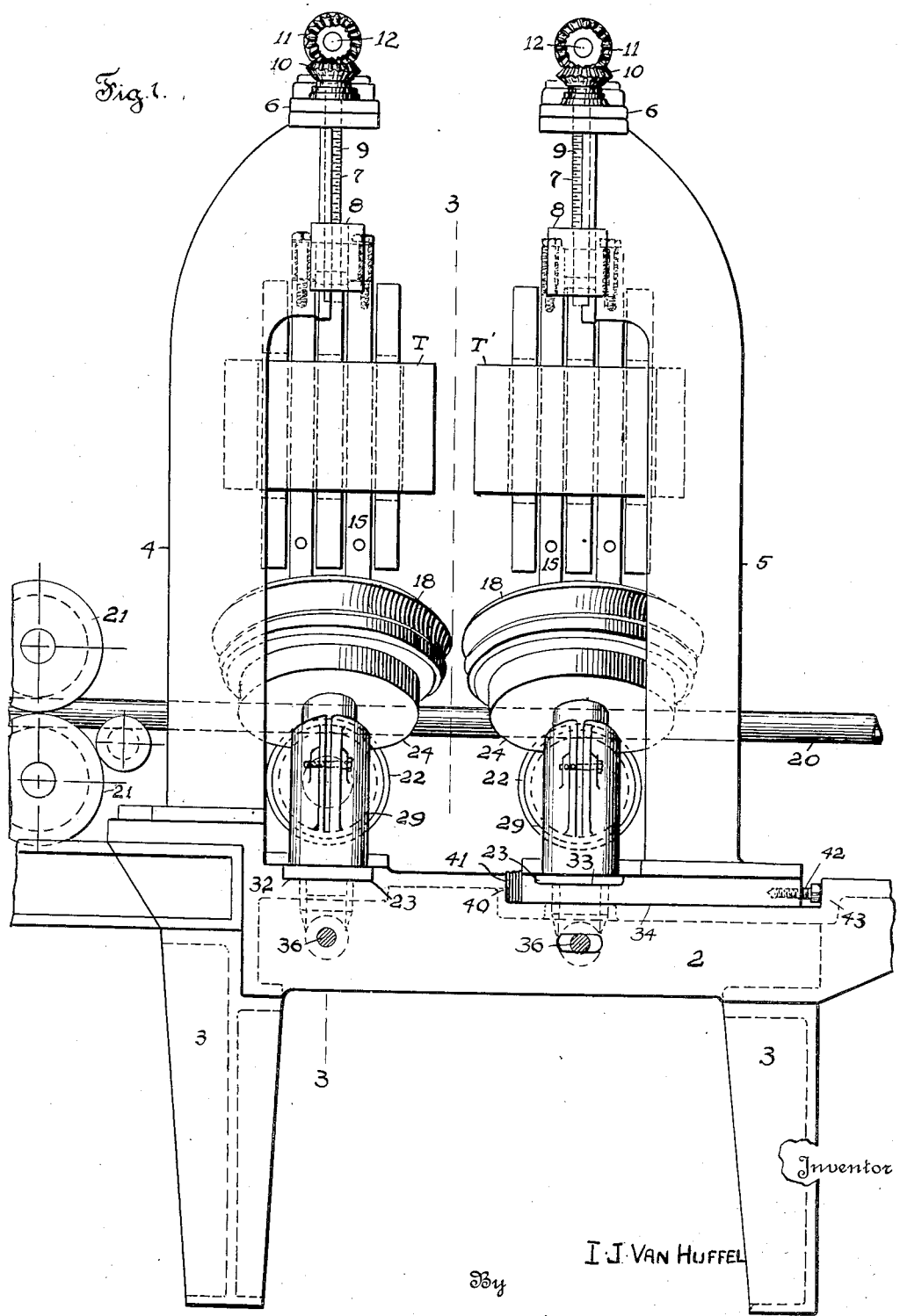
Figure 2:
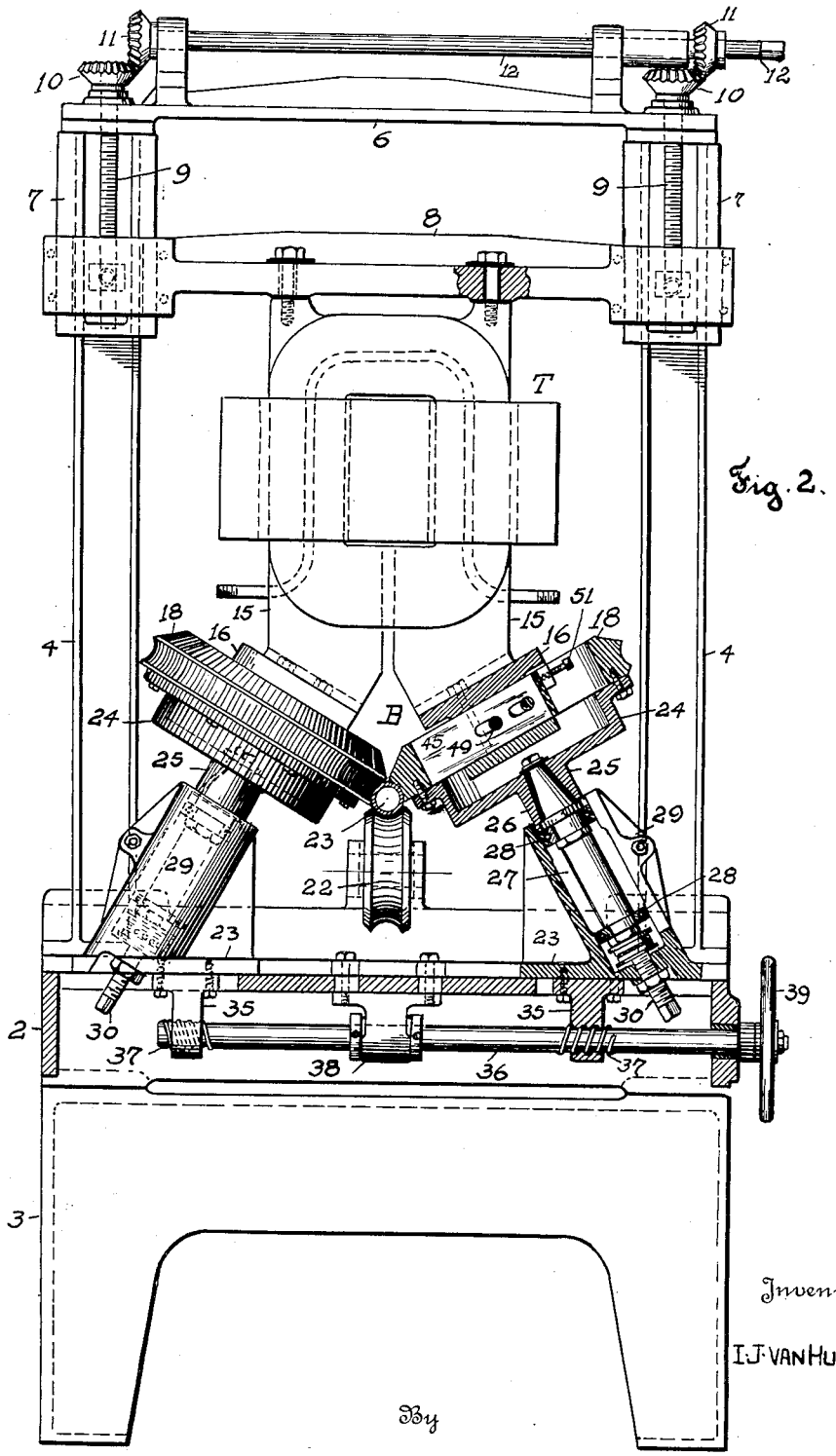
Figure 3:
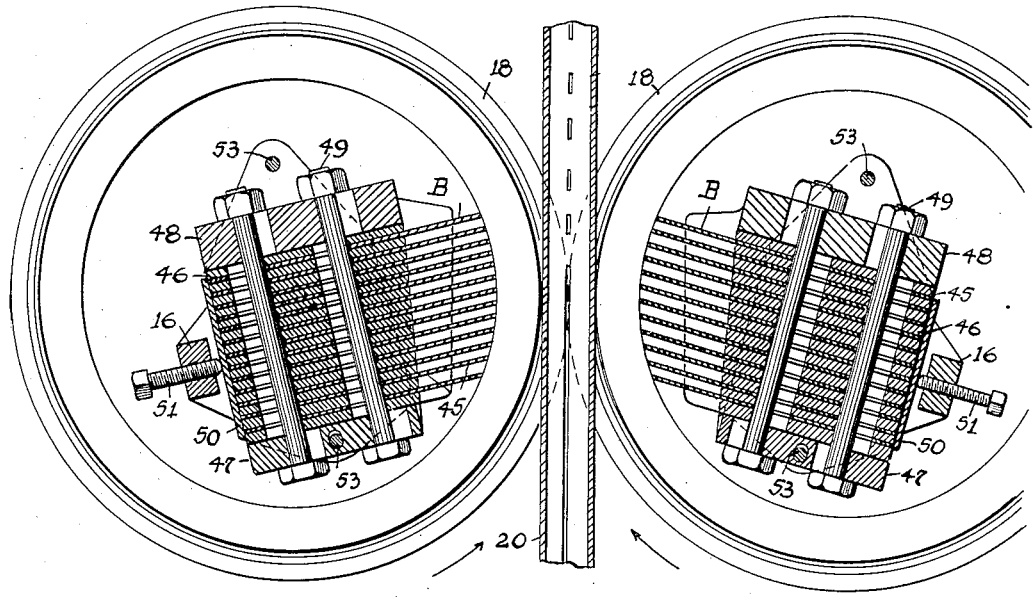
Figure 4:
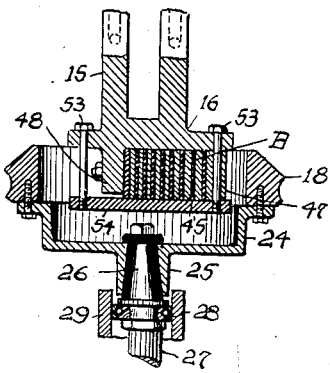

In the accompanying drawings, Fig. 1 is a side elevation of my improved welding machine. Fig. 2 is a vertical section of the machine on line 3—3 of Fig. 1, showing one of the annular welding electrodes in section and the companion electrode in elevation. Fig. 3 is an enlarged sectional view looking upwardly through a pair of welding electrodes and their respective electric current conducting brushes therein. Fig. 4 is a sectional view of one of the annular welding electrodes and a brush suspended therein from the secondary of a transformer, only the lower bifurcated end of one leg of the secondary being shown.

As shown the machine embodying the present improvements comprises a suitable bed or frame 2 mounted upon legs 3, and separate pairs of standards or uprights 4—4 and 5—5, respectively, supported upon opposite ends of the bed or frame. Connecting plates 6—6' secure the top of each pair of standards rigidly together, and a vertical portion of each standard is flanged to provide guide ways 7 for a sliding cross beam 8 which is suspended from and adapted to be raised and lowered by a pair of vertical screws 9—9 having bevel gears 10—10 which mesh with similar gears 11—11 on a cross shaft 12 at the top of each plate 6. Suspended centrally from each cross beam is an electric welding transformer, the pair being marked T and T', respectively, see Fig. 1. Each transformer has a divided secondary 15 with angular terminals 16—16 of opposite polarity, each of which support suitable means for clamping a series of electric-current conducting brushes B—B adjustably therein so that good contact may be established and maintained between the ends of each brush and a set of opposed welding electrodes 18—18 of ring shape. These brushes and electrodes are suspended in obtusely inclined relation so that the brushes may extend into the upper open side of the ring-shaped electrodes and engage the internal circular walls thereof, and so that both pairs of brushes may be raised bodily out of both rings or electrodes whenever cross beam 8 is elevated by rotating cross shaft 12. The peripheral surface of each ring or electrode is beveled in part to permit a pair of such rings to be inclined obtusely in respect to each other without coming into contact, and the lower peripheral part of each ring is grooved to permit rolling contact and a clamping pressure to be applied to a split tube 20 when passed between them. Feeding of the tube may be accomplished in any suitable way, for example, by feed rollers 21—21 located at one end of the machine, see Fig. 1, and the tube may be supported by idler rollers 22—22 immediately beneath the point of rolling contact of each pair of ring electrodes. The brushes are movable in a vertical plane, as previously described, and each pair of ring electrodes may be shifted transversely of the bed or frame either toward or away from each other so that the clamping pressure on the tube may be regulated. Thus each electrode is carried upon a slidable support 23 at the top of bed 2, as hereinafter described in more detail, and the paired electrodes of ring shape rotate independently as welding proceeds, the feed of the tube and the contacting pressure of the electrodes inducing such movement. For that purpose each ring electrode is detachably secured to the flange of a dished disk or wheel 24 having a hub 25 with a tapered opening which is bushed with insulating material and adapted to be removably clamped in a wedged position upon the tapered extremity 26 of an inclined shaft 27, and which shaft has rotatable bearing in ball bearing collars 28 held fixedly but removably within a split clamping holder 29 forming the main movable support for the electrode. An adjustable set screw 30 and thrust bearing is also provided at the lower end of shaft 27 to fix the shaft and electrode at any desired elevation and to place the opposing electrodes in proper working alignment. Each holder 29 has a base part 23 which operates as a slide when seated within transverse guide ways 32 and 33 in the top of bed 2 and in a movable table 34, respectively. Brackets 35 project downwardly from the base part 23 of each holder 29, and a shaft 36 having reversely-screw-threaded portions 37 sleeved through these brackets serves to adjust each pair of holders back and forth in respect to each other, the shaft having a bearing 38 affixed to bed 2 and being provided with a hand wheel 39 to rotate it when the paired electrodes are to be separated or brought nearer together. Table 34 supports standard 5 which carries transformer T' and one pair of ring electrodes, and this table and the parts thereon may be shifted bodily lengthwise of the tube to be welded, thereby placing the two sets of spaced electrodes nearer together, or further apart as working conditions may require in making two welds at spaced intervals in the seam at the same time. A variable setting of the two sets of electrodes may be effected and fixed by shims 40 introduced between one edge of plate 34 and a shoulder 41 on bed 2, and by a set screw 42 in the opposite edge of the plate where the head of the screw may bear against a second shoulder 43 in bed 2, see Fig. 1. The advantage of using and mounting two sets of electrodes for adjustment and change in position in the way described is fully explained in my co-pending application, but briefly, this arrangement permits a tube to be fed rapidly between separated pairs of electrodes to produce a series of welds interruptedly in the seam and in this case the interrupted welds are produced in interlapping union so that the product is continuously welded together without a gap or interstice linearly thereof. That is to say there are no unwelded places in the seam and product.

Now referring to Figs. 2, 3, and 4, the brush B for each electrode comprises a series of flat flexible blades 45 of varying length which are spaced apart by plates 46 and all clamped together between a clamping bar 47 and an integral flange 48 extending downwardly from one angular terminal 16 of secondary 15. Clamping is effected by horizontal bolts 49 which extend through slots in said parts to permit longitudinal adjustment of the contact blades in respect to the inner circular surface of the ring or electrode 18, and a backing plate 50 which engages the aligned ends of all of the blades 45 imparts a common adjustable movement to the blades upon adjusting a single set screw 51 on terminal 16. This terminal is in the form of a flat head which is perforated to receive vertical bolts 53 wherewith a bottom clamping plate 54 may be drawn upwardly against the bottom edges of contact blades 45 and thereby supplement the clamping action of horizontal bolts 49, see Fig. 4. Each secondary in this way embodies a brush holder at the end of each leg thereof, and the brushes or blades are adjustable to take up wear and to establish new contact settings with the ring electrodes when they are adjusted or moved back and forth in respect to each other. Blades 45 also extend beyond their spacing members 46 so that the exposed portions of the blades may spring or flex and maintain good contact during revolution of the ring electrode, and the blades in one brush holder extend obliquely to the blades of the other holder which is suspended from the same secondary. Contact is thus established in localized segmental areas in the two co-operating ring electrodes and the welding current is conducted from one brush to the other only where the two rings are opposed, thus permitting the larger circular part of each ring to cool during the rotative movement while concentering the entire heating current in a small section of each ring where engaged with the tube so that diffusion of the current is avoided and welding is expedited with maximum efficiency.

It is well known to those skilled in this art that the rate of feed of the stock governs whether either a continuous weld or a series of spaced welds will be produced by means of roller electrodes through which an alternating current is passed, say a current whose period is only about one-sixtieth of a second. If the rate of feed is slow the periodic flow takes place more often in each linear foot of the stock than if the rate of feed is faster, thereby permiting a continuous weld to be produced. But if the rate of feed is too fast to permit the stock to be heated uniformly linearly of the seam a series of interrupted welds are produced and a succession of welded and unwelded areas result. The present arrangement of electrodes and brushes permits either continuous or spaced welding operations.

As shown herein the ring electrodes are rotated by frictional contact with the tube as the tube is fed forward, but in welding thin gauge tubing I may use power to rotate the shafts which carry the ring electrodes. Obviously other changes or modifications may be made in the apparatus without departing from the spirit and scope of my invention.

What I claim, is:

1. An electrical welding apparatus, comprising a transformer having a secondary, provided with depending terminals, an independently rotatable electrode of circular form adjustably mounted opposite each terminal, and brushes for said electrodes having clamping connection with said terminals adjustable in a direction toward the circular welding portions of said electrodes.

2. An electrical welding apparatus, comprising a transformer having a secondary provided with angularly related terminals extending apart from each other, a pair of ring-shaped electrodes encircling said terminals, means for shifting said electrodes adjustably toward each other, separate sets of brushes upon said terminals extending into said ring-shaped electrodes, and means for shifting said sets of brushes adjustably toward each other into contact with their respective electrodes.

3. An electrical welding apparatus, comprising ring-shaped electrodes open at one side, means for supporting said electrodes for adjustment horizontally toward each other, and a transformer having a secondary provided with brushes extending into the open sides of said electrodes, said electrodes being mounted to rotate independently in reversely inclined planes, and said transformer being mounted for movement vertically in respect to open sides of electrodes.

4. An electrical welding apparatus, comprising a pair of co-operating electrodes each in the form of an endless one-piece ring rotatably mounted to permit the work to be fed between the pair of rings, and a set of electro-current conducting brushes engaging segmental portions only of the inner circumferential surfaces of said electrodes opposite their point of contact with the work, said brushes being adjustable in the direction of the circumference of its ring, and said rings being mounted on adjustable supports movable toward each other.

5. An electrical welding apparatus, comprising a transformer having a secondary provided with depending terminals, brushes affixed to said terminals, oppositely arranged electrodes of ring shape rotatably supported in contact with said brushes, and means for raising said transformer bodily to permit said brushes to be disengaged from said electrodes.

6. An electrical welding apparatus, comprising a transformer having a secondary formed with diverging extremities, obliquely-related brushes adjustably clamped upon said extremities, ring-shaped electrodes mounted obliquely to each other having contact with said brushes, and adjusting means for moving and setting said electrodes in clamping and feeding engagement with the work to be welded.

7. An electrical welding apparatus, comprising vertically inclined shafts having opposing ring-shaped electrodes detachably connected therewith, laterally adjustable supports for said shafts, a vertically adjustable transformer having secondary terminals depending therefrom, and contact brushes for said electrodes adjustably secured to said terminals adapted to localize the passage of the electric welding current in opposing segmental areas of said ring-shaped electrodes.

8. An electrical welding apparatus, comprising a transformer having a secondary with separated terminals, brushes bolted to each terminal, ring-shaped electrodes encircling said brushes, and means mounted upon each terminal adapted to shift the brushes thereon into end contact with the inner circumference of its associated electrode.

9. An electrical welding apparatus, comprising a main frame having upright standards thereon provided with guides, a cross beam movable vertically upon said guides, means for raising and lowering said cross beam, a transformer suspended from said beam having secondary terminals depending therefrom, separate sets of brushes affixed to said terminals, separate ring-shaped electrodes encircling said brushes, and means for supporting said electrodes rotatably upon said table.

10. An electrical welding apparatus, comprising a pair of ring electrodes, disk members to which said electrodes are attached, rotatable shafts carrying said disk members, and means adapted to support said shafts in reversely inclined position with the pair of electrodes obliquely related and in clamping position relatively to a piece of stock fed between said electrodes.

In testimony whereof I affix my signature.

ISADORE J. VAN HUFFEL.